United States Patent
Thomas et al.

(10) Patent No.: US 6,663,141 B2
(45) Date of Patent: Dec. 16, 2003

(54) INFLATABLE SAFETY RESTRAINT ASSEMBLY AND METHODS OF INSTALLING SUCH AN INFLATABLE SAFETY RESTRAINT ASSEMBLY

(75) Inventors: Scott David Thomas, Novi, MI (US); David Charles Viano, Bloomfield Hills, MI (US); Allen Richard Starner, Springboro, OH (US); James Lloyd Webber, Shelby Township, Macomb County, MI (US); David P. Schenck, Miamisburg, OH (US)

(73) Assignees: General Motors Corporation, Detroit, MI (US); Delphi Corporation, Troy, MI (US)

( * ) Notice: Subject to any disclaimer, the term of this patent is extended or adjusted under 35 U.S.C. 154(b) by 98 days.

(21) Appl. No.: 09/925,880

(22) Filed: Aug. 9, 2001

(65) Prior Publication Data

US 2003/0030257 A1 Feb. 13, 2003

(51) Int. Cl.[7] ............................................... B60R 21/22
(52) U.S. Cl. ..................... 280/730.2; 280/736; 280/742
(58) Field of Search ............................... 280/730.2, 736, 280/742

(56) References Cited

U.S. PATENT DOCUMENTS

| | | | | |
|---|---|---|---|---|
| 5,788,270 A | * | 8/1998 | HÅland et al. ............. | 280/729 |
| 6,073,960 A | | 6/2000 | Viano et al. ............. | 280/730.1 |
| 6,116,644 A | | 9/2000 | Viano et al. ............. | 280/743.1 |
| 6,155,594 A | * | 12/2000 | Ibe et al. .................. | 280/728.2 |
| 6,168,193 B1 | * | 1/2001 | Shirk et al. ............... | 280/730.2 |
| 6,168,194 B1 | * | 1/2001 | Cuevas et al. ............ | 280/730.2 |
| 6,241,278 B1 | * | 6/2001 | Roote et al. .............. | 280/730.2 |
| 6,299,200 B1 | * | 10/2001 | Bowers et al. ............ | 280/730.2 |
| 6,364,350 B2 | * | 4/2002 | Hoagland ................. | 280/730.2 |
| 6,382,660 B1 | * | 5/2002 | Starner et al. ............ | 280/728.2 |
| 6,386,581 B1 | * | 5/2002 | Ohno ......................... | 280/735 |
| 6,412,810 B1 | * | 7/2002 | Wipasuramonton et al. ........................ | 280/730.2 |
| 6,450,529 B1 | * | 9/2002 | Kalandek et al. ......... | 280/730.2 |
| 6,474,681 B2 | * | 11/2002 | Peer et al. ................ | 280/730.2 |
| 2001/0040364 A1 | * | 11/2001 | Viano et al. ............. | 280/730.1 |

* cited by examiner

*Primary Examiner*—Eric Culbreth
*Assistant Examiner*—Laura B. Rosenberg
(74) *Attorney, Agent, or Firm*—Laura C. Hargitt

(57) ABSTRACT

An inflatable safety restraint assembly is provided and methods are provided for installing such an inflatable safety restraint assembly into a vehicle. The inflatable safety restrain assembly comprises a cushion pack configured for attachment to an A-pillar of the vehicle and an inflator configured for attachment to a body structure of the vehicle other than the A-pillar. The inflatable safety restraint assembly further comprises a flexible tube having a first end connected to the cushion pack and a second end connected to the inflator. The flexible tube is adjustable to provide a number of orientations between the cushion pack attached to the A-pillar and the inflator attached to the vehicle body other than the A-pillar.

41 Claims, 8 Drawing Sheets

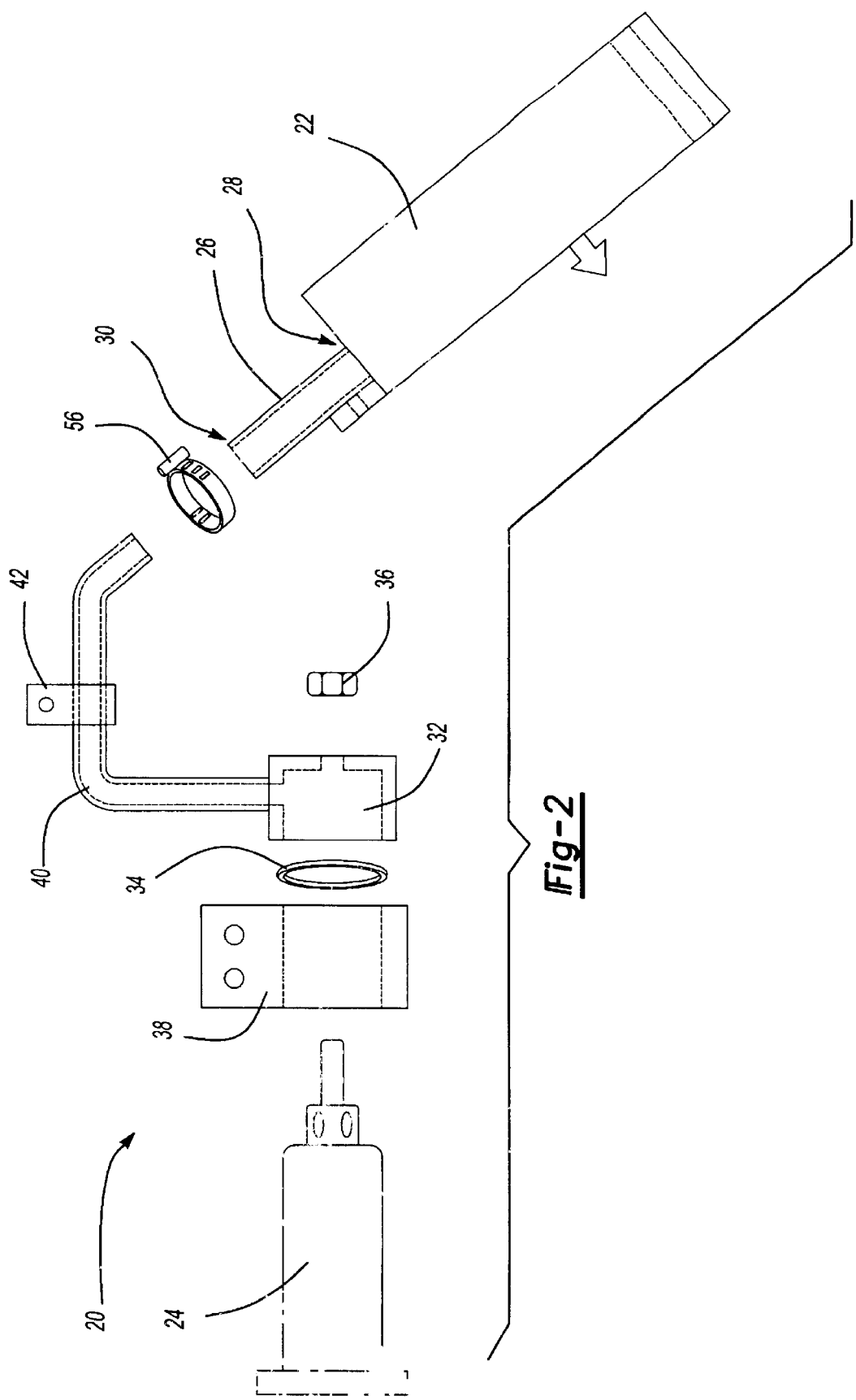

INFLATABLE SAFETY RESTRAINT ASSEMBLY AND METHODS OF INSTALLING SUCH AN INFLATABLE SAFETY RESTRAINT ASSEMBLY

TECHNICAL FIELD

The present invention relates to an inflatable safety restraint assembly for a vehicle, and more particularly to an inflatable safety restraint assembly for a vehicle having an A-pillar attached cushion pack that is connected with a flexible tube to an inflator attached to a body structure of the vehicle other than the A-pillar.

BACKGROUND OF THE INVENTION

It is known to provide an inflatable safety restraint assembly in a vehicle to augment protection traditionally afforded occupants of the vehicle through seat belts and other safety components of an interior of the vehicle. The inflatable safety restraint assembly can be an air bag system disposed within an interior or occupant compartment of the vehicle in close proximity to either a driver and/or one or more passenger areas. Typically, the air bag system includes an air bag module attached to a vehicle steering or instrument panel structure and also includes an air bag configured for deployment through an opening in a cover to extend into the interior or occupant compartment of the vehicle. A deployed air bag is configured to restrain movement of the occupant and assist in the protection of the occupant during a collision.

The air bag system is typically a unitary and fairly non-flexible unit that is attached to a single structure of the vehicle body. The unitary and fairly non-flexible unit has worked well to protect occupants of the vehicle, however the unitary and fairly non-flexible unit has limited interior and exterior design of the vehicle. The limitations to interior and exterior design of the vehicle would be eased while continuing to provide protection for occupants of the vehicle if a multi-element and flexible inflatable safety restraint assembly was available.

In view of the foregoing, it should be appreciated that it would be desirable to provide an inflatable safety restraint assembly for a vehicle having an A-pillar attached cushion pack that is connected with a flexible tube to an inflator attached to a body structure of the vehicle other than the A-pillar. In addition, it should be appreciated that it would be desirable to provide methods of installing an inflatable safety restraint assembly for a vehicle having an A-pillar attached cushion pack that is connected with a flexible tube to an inflator attached to a body structure of the vehicle other than the A-pillar. Furthermore, additional desirable features will become apparent to one skilled in the art from the foregoing background of the invention and following detailed description of a preferred exemplary embodiment and appended claims.

SUMMARY OF THE INVENTION

In accordance with the teachings of the present invention, an inflatable safety restraint assembly is provided for a vehicle and methods are also provided for installing such an inflatable safety restraint assembly. The inflatable safety restraint assembly comprises a cushion pack configured for attachment to an A-pillar of the vehicle and an inflator configured for attachment to a body structure of the vehicle other than the A-pillar. The inflatable safety restraint assembly further comprises a flexible tube having a first end connected to the cushion pack and a second end connected to the inflator. The flexible tube is adjustable to provide a number of orientations between the cushion pack attached to the A-pillar and the inflator attached to the vehicle body other than the A-pillar.

BRIEF DESCRIPTION OF THE DRAWINGS

The present invention will hereinafter be described in conjunction with the appended drawing figures, wherein like numerals denote like elements, and:

FIG. 2 is an exploded view of the inflatable safety restraint assembly of FIG. 1;

DETAILED DESCRIPTION OF THE PREFERRED EXEMPLARY EMBODIMENT

The following detailed description of a preferred exemplary embodiment of the invention is mainly exemplary in nature and is not intended to limit the invention or the application or use of the invention.

Figure 1:
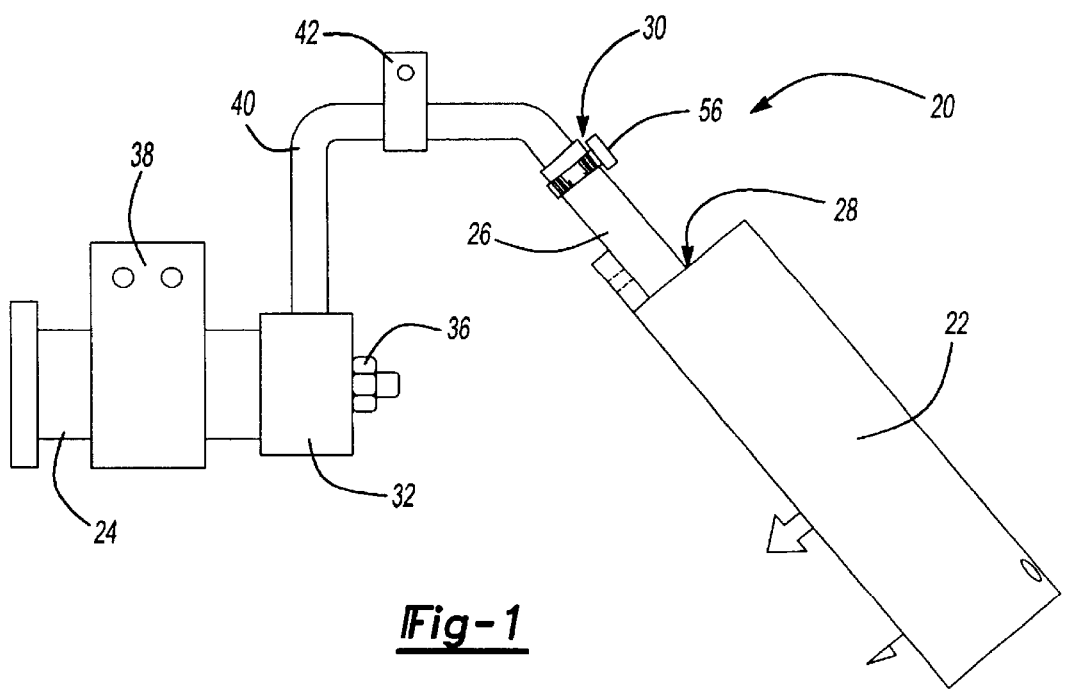
FIG. 1 is an inflatable safety restraint assembly according to a preferred exemplary embodiment of the present invention.

Referring to FIG. 1 and FIG. 2, an inflatable safety restraint assembly 20 for a vehicle (not shown) is illustrated according to a preferred exemplary embodiment of the present invention. The inflatable safety restraint assembly 20 includes, but is not limited to, a cushion pack 22 that is configured for attachment to a front side door pillar (not shown) of the vehicle that is commonly referred to as an A-pillar and referred to herein as an A-pillar. The inflatable safety restraint assembly 20 also includes, but is not limited to, an inflator 24 that is configured for attachment to a body structure (not shown) of the vehicle other than the A-pillar.

For example, the inflator 24 can be configured for attachment to a body structure of the vehicle such as a vehicle instrument panel, a vehicle body floor, a vehicle body side, a vehicle body roof and a vehicle seat. The inflatable safety restraint assembly 20 further includes, but is not limited to, a flexible tube 26 having a first end 28 connected to the cushion pack 22 and a second end 30 connected to the inflator 24. In accordance with the present invention, the flexible tube 26 is adjustable to connect the first end 28 to the cushion pack 22 that is attached to the A-pillar and connect the second end 30 to the inflator 24 that is attached to the body structure of the vehicle other than the A-pillar (i.e., the flexible tube is adjustable such that a number of orientations can be provided between the cushion pack and the inflator that are attached to the A-pillar and vehicle body other than the A-pillar, respectively. As used herein, "adjustable" shall mean capable of alteration or change in shape, size and/or configuration.

More specifically, according to a preferred exemplary embodiment of the present invention, the inflator 24 is preferably attached to the body structure other than the A-pillar with an inflator bracket 38. However, other mechanisms can be utilized to attach the inflator 24 to the body structure other than the A-pillar. The inflator 24 is also preferably connected to a plenum 32 with a suitable sealing mechanism 34 and fastener 36. The sealing mechanism 34 can be any number of sealing mechanisms, such as an o-ring, and the fastener 36 can be any number fasteners, such as nuts, bolts, screws, adhesives and the like. The plenum 32 is preferably connected to a rigid fill tube 40 and attached to the vehicle with a fill tube bracket 42.

Figure 4:
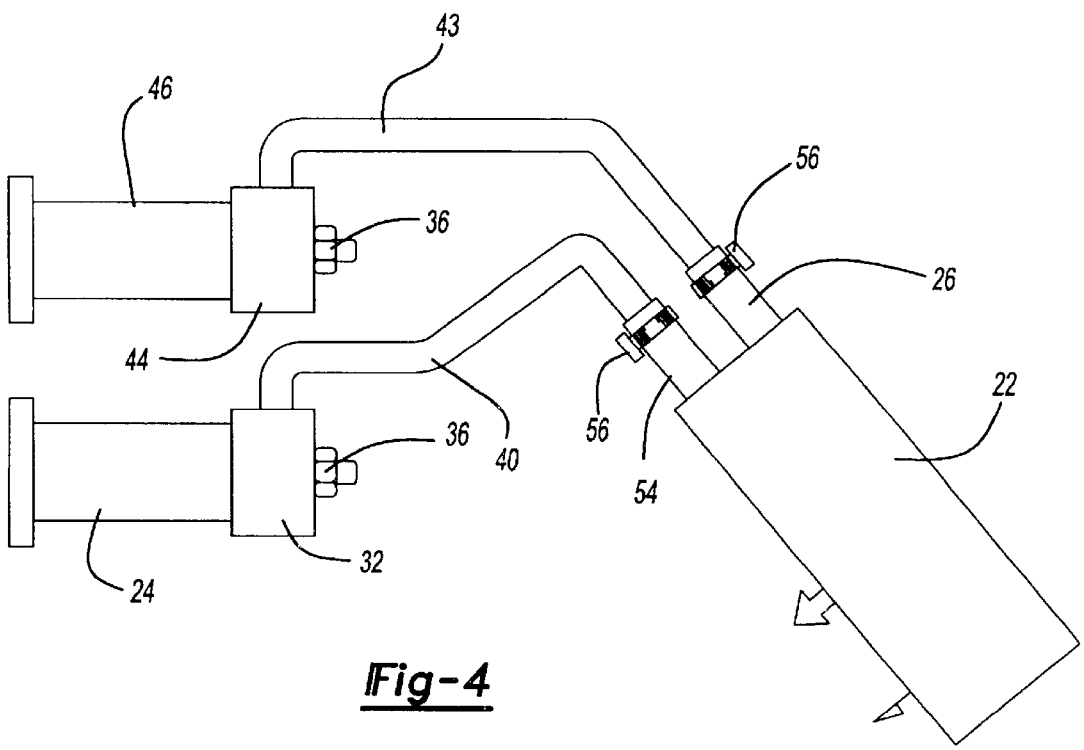
FIG. 4 is an inflatable safety restraint assembly having multiple inflators connected to the cushion pack with multiple plenum and rigid fill tubes according to a preferred exemplary embodiment of the present invention.
Figure 3:
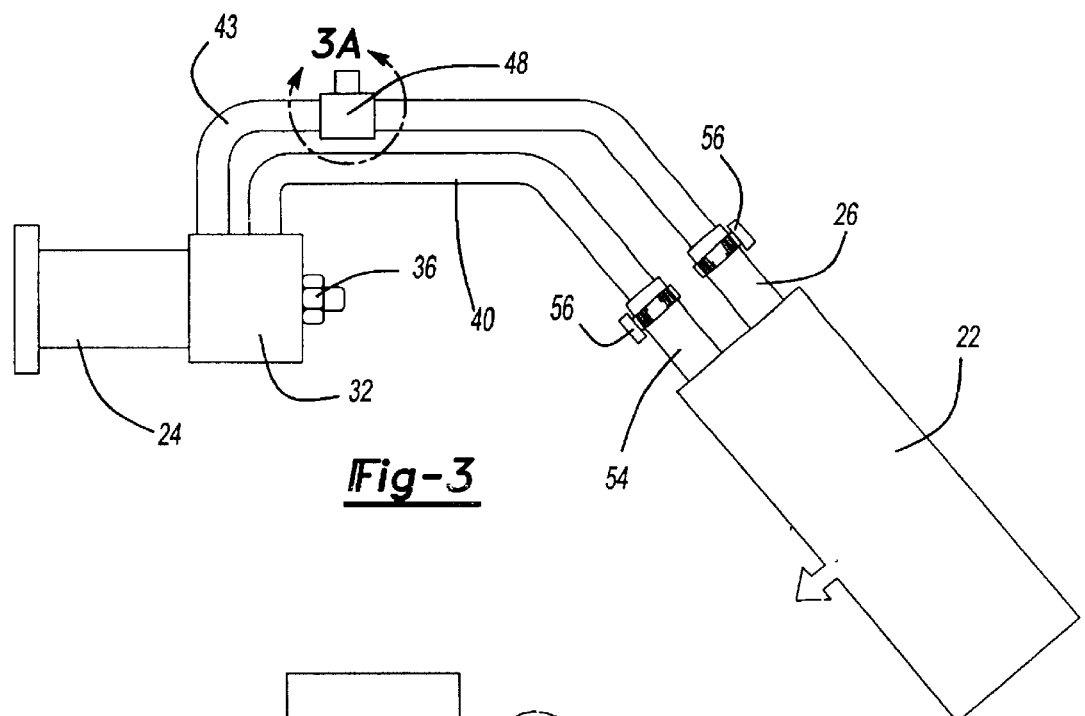
FIG. 3 is an inflatable safety restraint assembly having a plenum connected to multiple rigid fill tubes according to a preferred exemplary embodiment of the present invention.
Figure 3A:
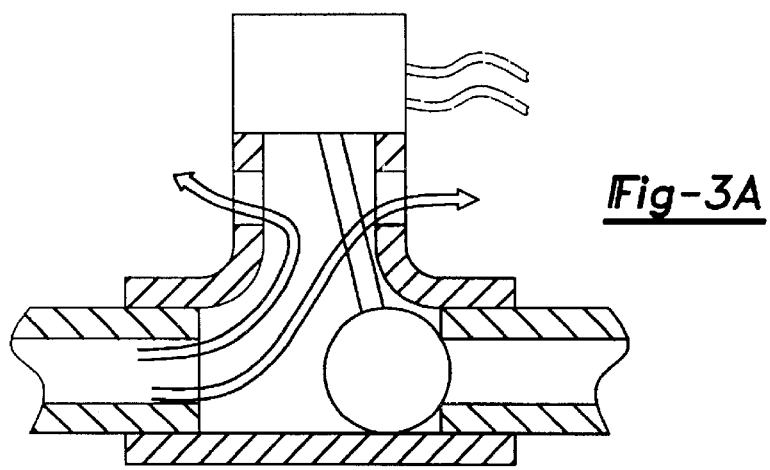
FIG. 3A is an enlarged view of an inflatable safety restraint assembly according to a preferred exemplary embodiment of the present invention.
Figure 3B:
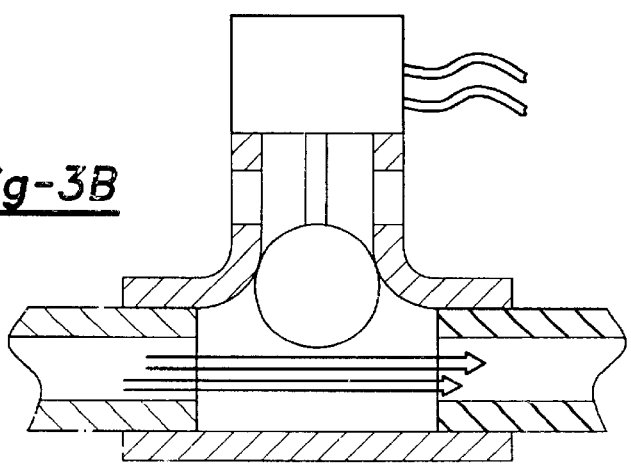
FIG. 3B is another enlarged view of an inflatable safety restraint assembly according to a preferred exemplary embodiment of the present invention.

The plenum 32 can also be configured to connect a second rigid fill tube 43 to the inflator 24 as shown in FIG. 3 or a second rigid fill tube 43 can be connected to a second plenum 44 that is connected to a second inflator 46 that is configured for attachment to the body structure of the vehicle other than the A-pillar as illustrated in FIG. 4. The inflatable safety restraint systems 20 having multiple rigid fill tubes (40,43) as illustrated in FIG. 3 and FIG. 4 can be used for any number of purposes, including routing inflator gas to separate chambers of the cushion pack 22. An electronic control valve 48, which can be a pyrotechnically activated control valve, can be used to enable flow within the rigid fill tube 40 and/or the second rigid fill tube 43, as shown in the first enlarged view FIG. 3A taken from FIG. 3, and can also be used to block and/or redirect flow as shown in the second enlarged view FIG. 3B. The rigid fill tube 40 and second rigid fill tube 43 can be attached to a single flexible tube. Alternatively, the rigid fill tube 40 can be attached to the flexible tube 26 and the second rigid fill tube 43 can be attached to a second flexible tube 54 as shown in FIG. 3 and FIG. 4.

Referring to FIG. 1 and FIG. 2, which illustrate the inflatable safety restraint assembly 20 with the rigid fill tube 40 attached to the flexible tube 26 in order to maintain simplicity and clarity in this detailed description of a preferred exemplary embodiment, the rigid fill tube 40 is preferably attached to the flexible tube 26 with a clamping device 56. Alternatively, the rigid fill tube 40 can be attached to the flexible tube 26 with any other suitable attachment device, such as an adhesive, press fit or a combination thereof, for example. More specifically, the rigid fill tube is connected to the first end of the flexible tube 26 with the clamping device 56 or other suitable attachment device.

The flexible tube 26 can be any number of flexible tubes that can withstand the deployment loads generated during discharge of gas by inflator 24 upon the sensing of predetermined vehicle conditions and also withstand environmental stresses. As used herein, "flexible" shall mean the ability to bend without breaking, pliant, adjustable to change and/or capable of modification. Therefore, the flexible tube 26 can be a fiber reinforced hose, flexible metal hose, or multiple rigid tubes that are joined with rotating joints, or the like, for example. The flexible tube 26 is bent, adjusted and or modified to connect the rigid fill tube 40 to the cushion pack 22 attached to the A-pillar of the vehicle. Preferably, the flexible tube 26 is connected to a cushion diffuser of the cushion pack 22 or the cushion diffuser of the cushion pack 22 is connected to the solid fill tube 40.

Figure 5:
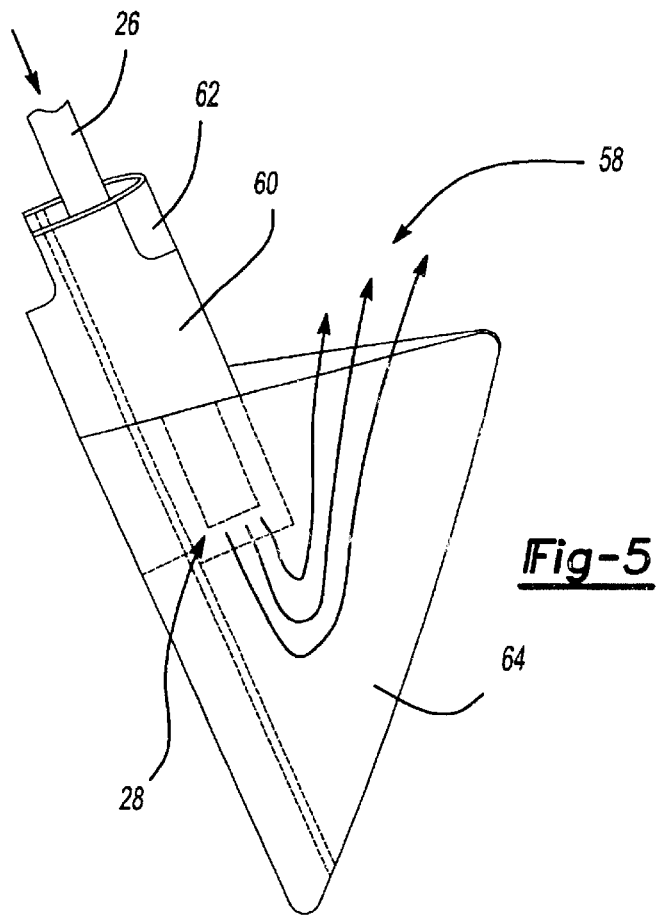
FIG. 5 is an enlarged view of a cushion diffuser of the cushion pack of FIG. 1 according to a preferred exemplary embodiment of the present invention.

Referring to FIG. 5, an enlarged view is shown of a cushion diffuser 58 of the cushion pack 22 of FIG. 1 and FIG. 2. The flexible tube 26 is introduced into a pliable fill tube sock 60 of the cushion diffuser 58 so that excessive movement of the flexible tube 26 does not occur during deployment of the cushion pack. The pliable fill tube sock 60 is preferably strengthened with a reinforcement material 62 that can be sewn, mechanically attached or otherwise affixed to numerous locations on the pliable fill tube sock 60. The pliable fill tube sock 60 is attached to the flexible tube 26 or the solid fill tube 40 with any number of devices, such as a clamping device, adhesive or the like. The attachment of the pliable fill tube sock 60 to the flexible tube 26 or solid fill tube 40 provides for a redirection of the gases emitted from the second end 28 of the flexible tube 26 with a diffuser 64.

Figure 6:
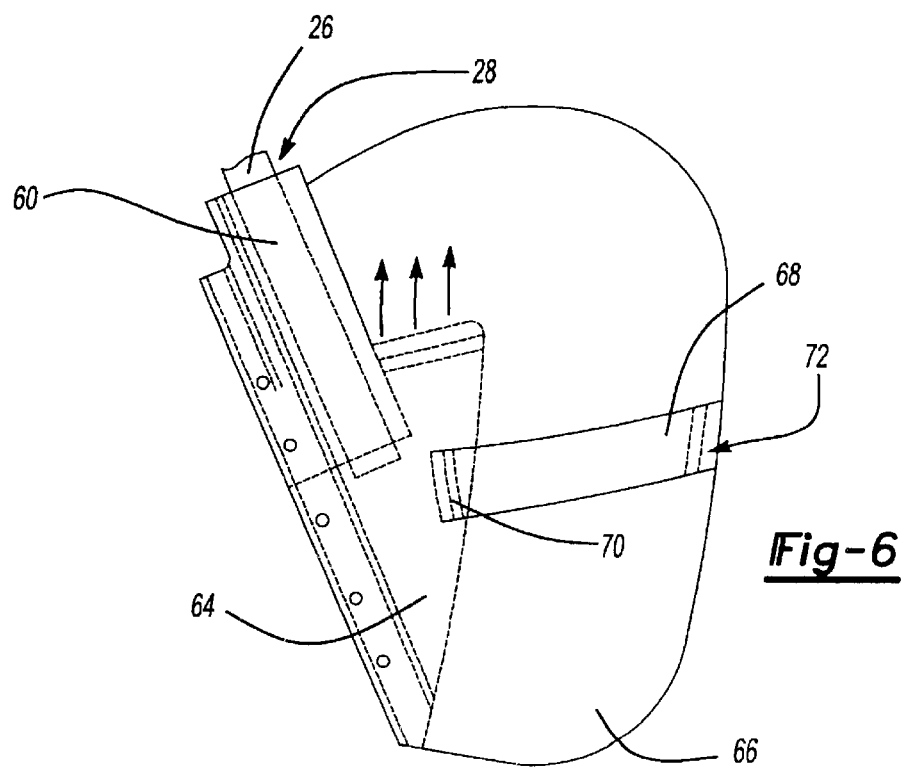
FIG. 6 is the cushion diffuser within the cushion pack of FIG. 1 according to a preferred exemplary embodiment of the present invention.

Referring to FIG. 6, the pliable fill tube sock 60 and the diffuser 64 are preferably attached to the outer cushion 66 using any number of attachment devices, such as stitching. In addition, in order to strengthen the structural integrity of the pliable fill tube sock 60 and the diffuser 64, the pliable fill tube sock 60 and the diffuser 64 can be attached using any number of attachment devices, such as stitching. Furthermore, the diffuser 64 is preferably attached to the outer cushion 66 at locations other than the common attachment location of the pliable fill tube sock 60 and the diffuser 64 to control the motion of the diffuser 64 during deployment of the outer cushion 66.

The diffuser 64 can also be attached to the outer cushion 66 with a tether 68 having a first end 70 attached to the diffuser 64 with stitching or other attachment means and a second end 72 attached to the outer cushion 66 with stitching or other attachment means. Alternatively, the first end 70 of the tether 68 can be formed as an integral part of the diffuser 64 and/or the second end of the tether 68 can be formed as an integral part of the outer cushion 66. Additional tethers can also be utilized within the interior of the outer cushion 66 in accordance with the present invention, and tear stitching can be added in accordance with the present invention to control deployment kinematics of the cushion pack attached to the A-pillar.

Figure 7:
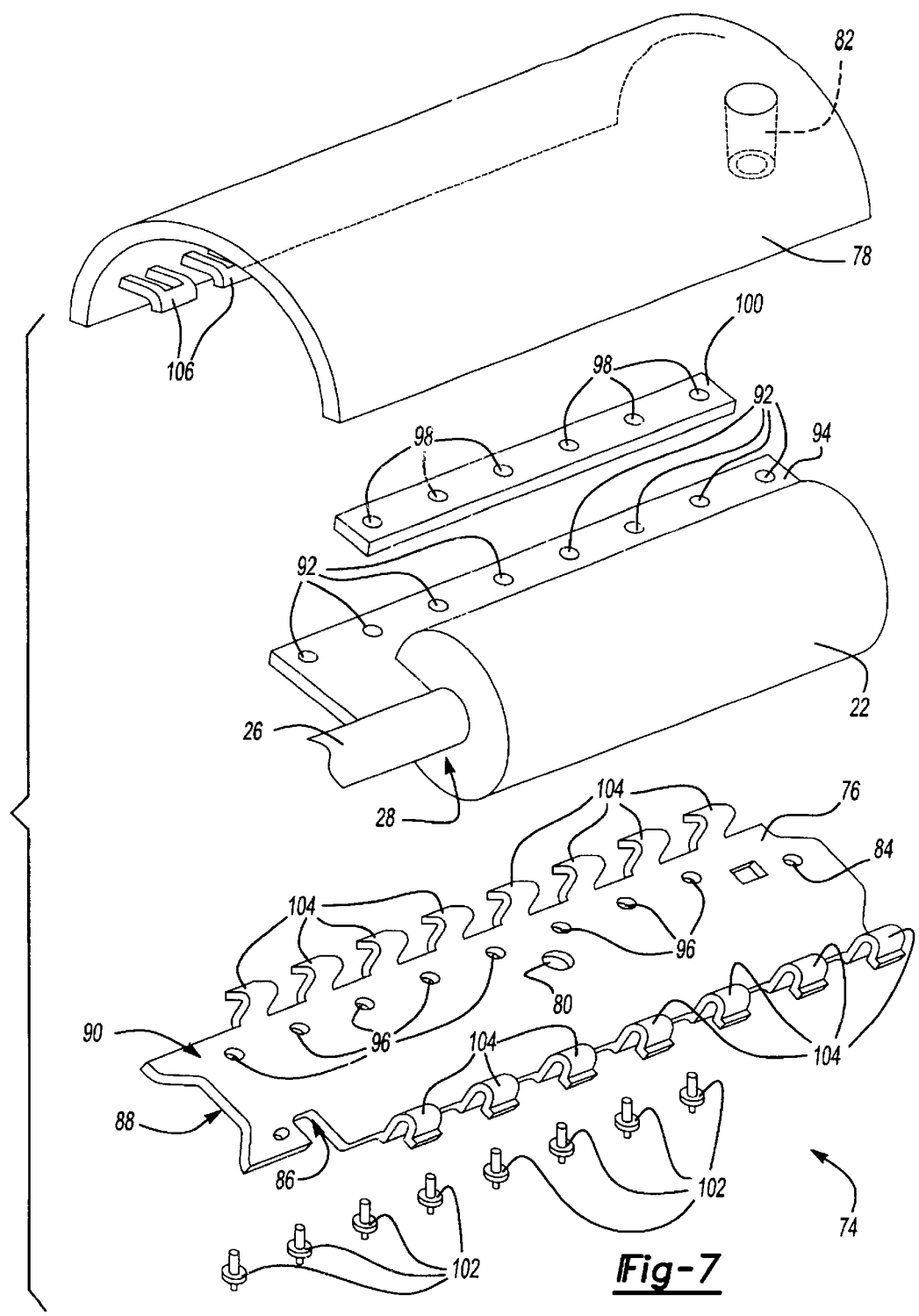
FIG. 7 is an exploded view of the A-Pillar subassembly for attachment of the cushion pack to the A-Pillar according to a preferred exemplary embodiment of the present invention.

The attachment of the cushion pack to the A-pillar is preferably provided with an A-pillar subassembly 74 that is shown in FIG. 7. Referring to FIG. 7, the A-pillar subassembly 74 is comprised of a carrier 76 and show surface trim piece 78, configured to attach the cushion pack 22 and a portion of the flexible tube 26 to the A-pillar (not shown). An attachment aperture 80 in the carrier 76 receives a fastener for connection to the A-pillar. The fastener can be any number of devices, such as a stud, tab, snap in fastener, bolts. An attachment aperture 82 of the show surface trim piece 78 can also be provided in accordance with the present invention for an attached or separate threaded fastener that would pass through a corresponding aperture 84 in the carrier 76. The carrier 76 may also have a cutout 86 to allow access from the bottom surface 88 of the carrier 76 to the top surface 90 of the carrier 76.

The cushion pack 22 and flexible tube 26 are preferably attached to the carrier 76 using a first series of apertures 92 formed in a structural attachment 94 of the cushion pack 22 and flexible tube 26, a second series of apertures 96 formed in the carrier 76, and a third series of apertures 98 formed in a reinforcement member 100. Alternatively, multiple structural reinforcements, such as washers, can be used for one or more of the apertures (92,94,96). Rivets 102 or alternatively bolts, studs, snap-in fasteners or other suitable attachment devices are preferably inserted into one or more of the first series of apertures 92, second series of apertures 96 and third series of apertures 98 to secure the cushion pack 22 and flexible tube 26 to the carrier 76.

The carrier 76 and the show surface trim piece 78 are preferably attached with a series of hook attachments 104 of the carrier 76 that are configured to mate with a series of receptacles 106 of the show surface trim piece 78. As can be appreciated by one of ordinary skill in the art, individual receptacles or a single continuous receptacle can be used to mate with one or more of the hook attachments 104. However, any number of configurations can be used to mate the carrier 76 and the show surface trim piece 78 in accordance with the present invention to complete the A-pillar subassembly 74. In an airbag deployment situation, the show surface trim piece 78 can be configured to open in one of many ways, including, but not limited to, rupture of an integral tear seam, fracture of the receptacles 106 and/or deformation of the hook attachments 104, for example.

As can be appreciated from the foregoing description, several methods of installing the inflatable safety restraint assembly in which the cushion pack is attached to the A-pillar of the vehicle and the inflator is attached to a body structure of the vehicle other than the A-pillar may be employed. Generally, the method of installing an inflatable safety restraint assembly in a vehicle comprises attaching a cushion pack to an A-pillar of the vehicle, connecting a first end of a flexible tube to the cushion pack and adjusting the flexible tube so that a second end of the flexible tube is connected to an inflator that is configured for attachment to a body structure of the vehicle other than said A-pillar of the vehicle. As can be appreciated by one of ordinary skill in the art, a vast number of variations exist for this method. Therefore, two detailed examples of the method are subsequently described in this detailed description of a preferred exemplary embodiment to illustrate the method of installing an inflatable safety restraint assembly in a vehicle according to the present invention. However, these two examples should not be construed as the only methods within the scope of the present invention.

Figure 8A:
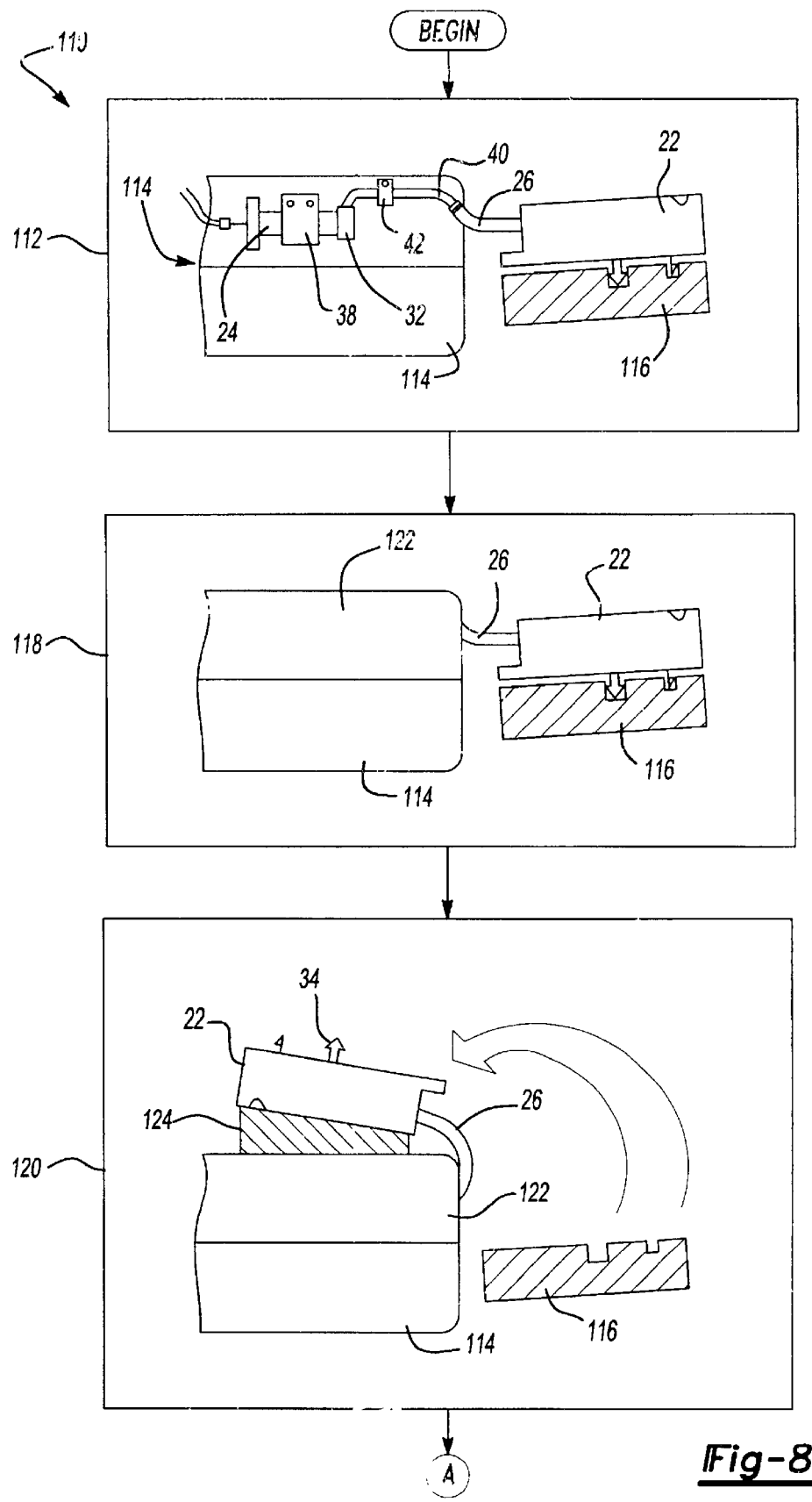
FIGS. 8A and 8B is an illustration of a first method of installing an inflatable safety restraint assembly according to a preferred exemplary embodiment of the present invention.
Figure 8B:
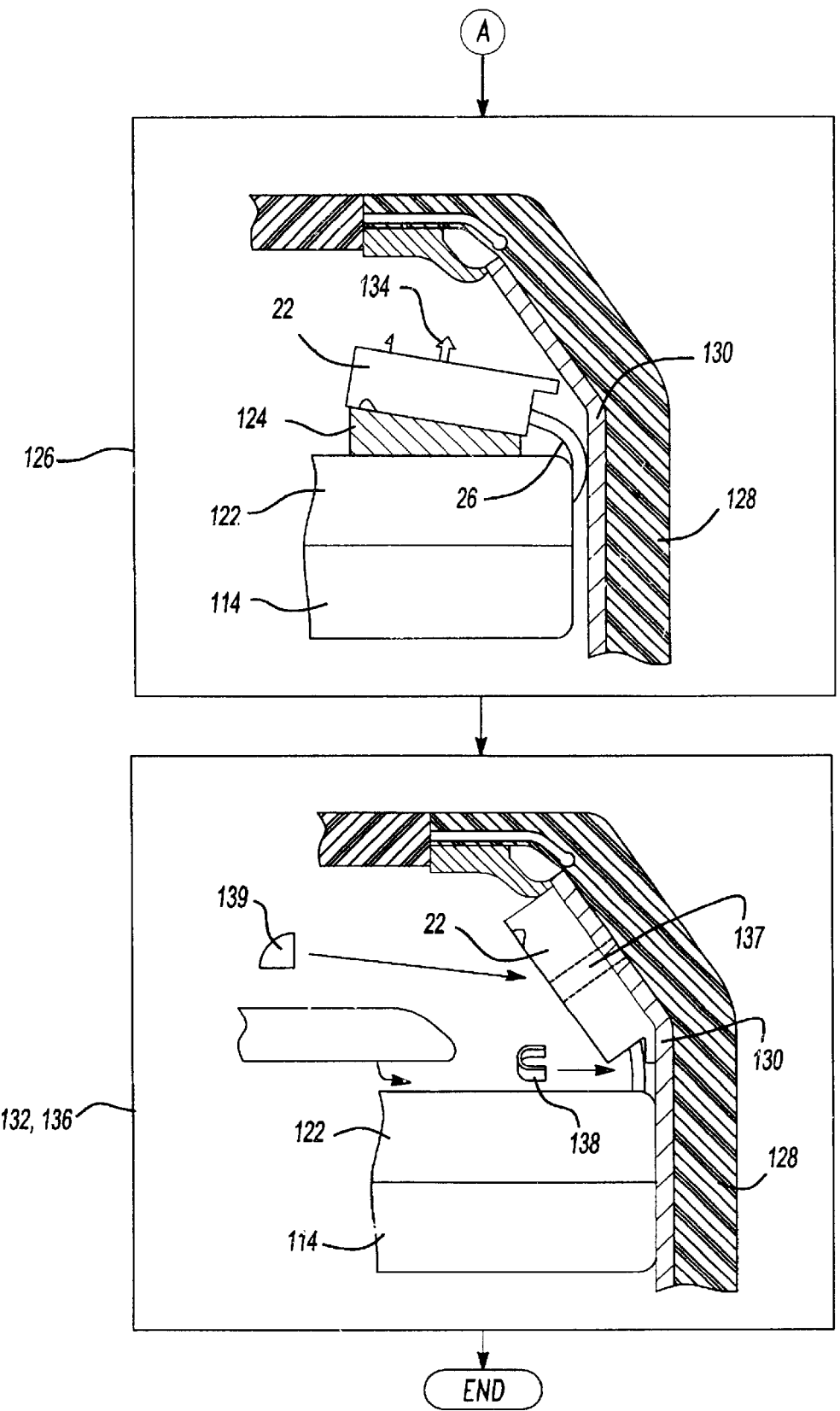

First Example of Installing an Inflatable Safety Restraint Assembly in a Vehicle Referring to FIGS. 8A and 8B, a first example of a method 110 of installing an inflatable safety restraint assembly in a vehicle is illustrated according to the present invention. The first step 112 of the method 110 is comprised of attaching the inflator 24, plenum 32 and rigid fill tube 40 to the vehicle body other than the A-pillar, and in this example to the instrument panel 114, with the inflator bracket 38 and rigid fill tube bracket 42. The flexible tube 26 is adjusted (e.g., rotated, translated and/or bent) such that the cushion pack 22 is positioned on a cushion pack carrier 116, which can be any number of carrier apparatuses, adjacent to the instrument panel 114. With the inflator 24 attached to the instrument panel 114, the inflator 24 is electrically connected for operation.

The second step 118 and third step 120 of the method 110 are performed after the inflator 24, plenum 32 and rigid fill tube 42 are attached to the instrument panel 114 in the first step 112 of the method. The second step 118 is comprised of installing an outer surface cover 122 on the instrument panel 114 and the third step 120 is comprised of adjusting the flexible tube 26 such that the cushion pack 22 is located on the outer surface cover 122. A second cushion pack carrier 124, which is configured for a location on the outer surface cover 122, is preferably used to hold the cushion pack 22 on the outer surface cover 122.

Once the instrument panel 114 is configured with the first step 112, second step 118 and third step 120 of the method 110, the fourth step 126 is performed in accordance with the present invention. The fourth step 126 is comprised of inserting the instrument panel 114 into the vehicle body. The fourth step 126 is also comprised of adjusting and/or positioning the flexible tube 26 so that the door seal 130 of the vehicle body is clear.

Preferably after the fourth step 126 is completed, the fifth step 132 is conducted, which is comprised of installing the cushion pack 22 into the A-pillar 128. The fifth step includes adjusting and/or positioning the flexible tube 26 to accommodate the upward translation of the cushion pack 22 from the top of the outer surface cover 122 of the instrument panel 114 to the A-pillar 128. The cushion pack 22 is preferably attached to the A-pillar 128 with a keyhole slot (not shown) that is configured to receive a keyhole member of the cushion pack 22. However, any other attachment method and device can be used to secure the cushion pack 22 to the A-pillar 128.

The sixth step 136 of the method 110 is preferably conducted to provide added protection for the flexible tube 26. More particularly, the sixth step is comprised covering the flexible tube 26 with a flexible tube protector 138. The flexible tube protector 138 is configured to prevent damage to the flexible tube protector 138 due to movement of the A-pillar 128 and instrument panel 114 because of a side impact. The flexible tube protector 138 can be attached to the instrument panel 114, cushion pack 22, A-pillar or some combination thereof using any number of methods such as mechanical fastening and/or welding. Finally, a closeout panel 139 can be installed to cover the opening between the cushion pack 22 and the instrument panel 114, and a fastener can be subsequently installed to attach the end of the side airbag tether 137 to the A-pillar 128, the carrier 76 or the A-pillar 128 and the carrier 76.

Figure 9:
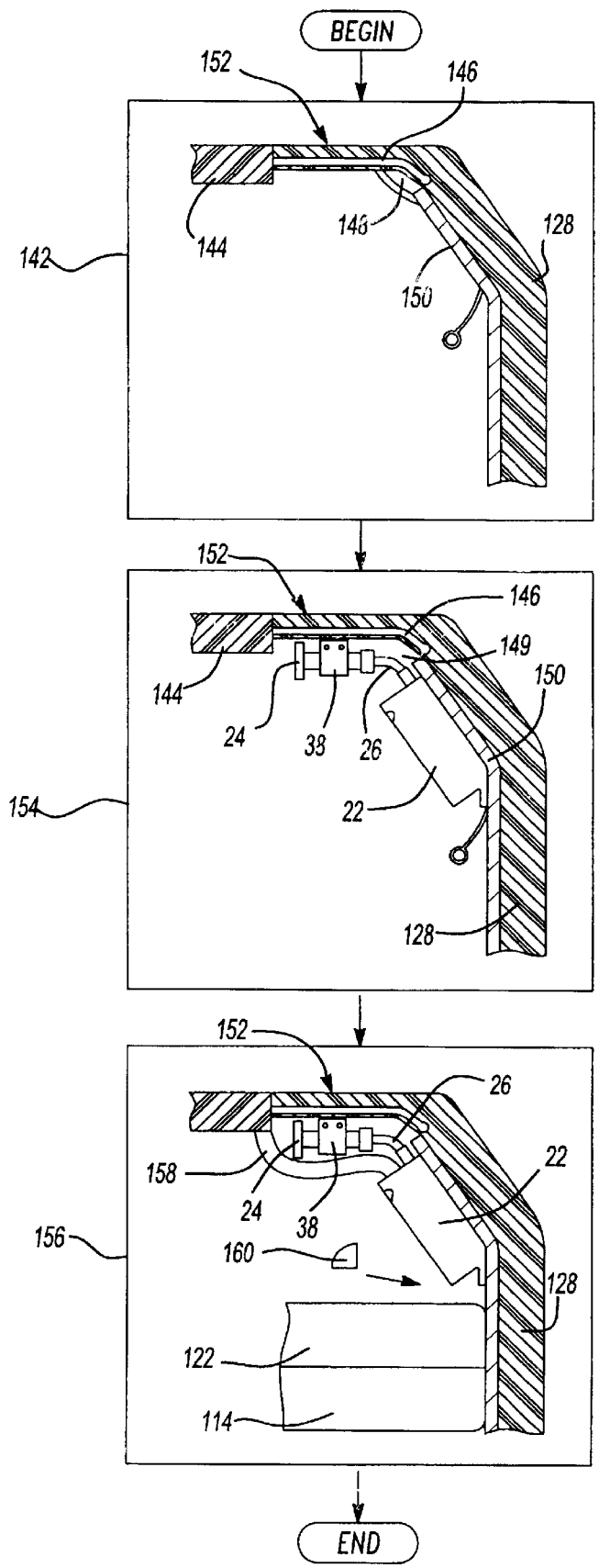
FIG. 9 is an illustration of a second method of installing an inflatable safety restraint assembly according to a preferred exemplary embodiment of the present invention.

Second Example of Installing an Inflatable Safety Restraint Assembly in a Vehicle Referring to FIG. 9, a second example of a method 140 of installing an inflatable safety restraint assembly in a vehicle is illustrated according to the present invention. The first step 142 of the method 140 is comprised of pre-configuring the A-pillar 128 and roof 152. For example, the sunroof 144, sunroof drain tube 146, roof rail inflatable safety restraint 148 and/or door seal 150 can be installed in the A-pillar and roof 152. Any one of these components and other components can be installed during the pre-configuring of the A-pillar and roof 152 in the first step 142 of the method 140.

After the pre-configuring of the A-pillar 128 and the roof 152, the second step 154 is performed according to this second illustrative example. The second step 154 is comprised of attaching the inflator 24 to the roof 152 (i.e., a vehicle body other than the A-pillar 128) with the inflator bracket 38. The cushion pack 22 is also attached to the vehicle body, but attached to the A-pillar 128. As the cushion pack 22 is attached to the A-pillar 128 and the inflator 24 is attached to the roof 152, the flexible tube 26 is adjusted (e.g., rotated, translated and/or bent) such that the cushion pack 22 is in operable communication with the inflator 24.

The third step 156 of the method 140 is comprised of installing the headliner 158 and the instrument panel 114. The headliner 158 can be configured to lip-over or lip-under the cushion pack 22. A trim piece (not shown) can be installed to cover the joint line between any A-pillar cover (not shown) and the headliner and a close out panel 160 can be installed between the cushion pack 22 and the instrument panel 114 for aesthetics.

From the foregoing description, it should be appreciated that an inflatable safety restraint assembly is provided for a vehicle having a cushion pack attached to an A-pillar that is connected with a flexible tube to an inflator attached to a body structure of the vehicle other than the A-pillar. In addition, it should be appreciated that methods are provided for installing an inflatable safety restraint assembly for a vehicle having a cushion pack attached to an A-pillar that is connected with a flexible tube to an inflator attached to a body structure of the vehicle other than the A-pillar. Furthermore, while a finite number of preferred exemplary embodiments have been presented in the foregoing detailed description of a preferred exemplary embodiment, it should be appreciated that a vast number of variations in the embodiments exist. It should also be appreciated that these preferred exemplary embodiments are only examples, and are not intended to limit the scope, applicability, or configuration of the invention in any way. Rather, the foregoing detailed description provides those skilled in the art with a convenient road map for implementing the preferred exemplary embodiments of the invention. It being understood that various changes may be made in the function and arrangement of elements described in the detailed description of a preferred exemplary embodiment without departing from the spirit and scope of the invention as set forth in the appended claims.

What is claimed is:

1. An inflatable safety restraint assembly for a vehicle, comprising:
    a cushion pack comprising an outer cushion and configured for attachment to an A-Pillar of the vehicle;
    an inflator configured for attachment to a body structure of the vehicle other than said A-pillar of the vehicle;
    a flexible tube having a first end connected to said cushion pack and a second end connected to said inflator, said flexible tube configurable for translation and rotation to connect said first end to said cushion pack attached to said A-Pillar and said second end to said inflator at said body structure of the vehicle other than said A-Pillar of the vehicle; and
    a cushion diffuser connected to said first end of said flexible tube and said cushion pack; wherein said cushion diffuser is configured to redirect gas emitted from said first end of said flexible tube; wherein a diffuser portion of said cushion diffuser is attached to said outer cushion of said cushion pack with a tether.

2. The inflatable safety restraint assembly for a vehicle of claim 1, wherein said body structure of the vehicle other than said A-pillar of the vehicle is a vehicle instrument panel.

3. The inflatable safety restraint assembly for a vehicle of claim 1, wherein said body structure of the vehicle other tan said A-pillar of the vehicle is a vehicle roof.

4. The inflatable safety restraint assembly for a vehicle of claim 1, wherein said body structure of the vehicle other than said A-pillar of the vehicle is a vehicle floor.

5. The inflatable safety restraint assembly for a vehicle of claim 1, wherein said body structure of the vehicle other than said A-pillar of the vehicle is a vehicle seat.

6. The inflatable safety restraint assembly for a vehicle of claim 1, wherein said body structure of the vehicle other than said A-Pillar of the vehicle is a vehicle side structure.

7. The inflatable safety restraint assembly for a vehicle of claim 1, further comprising an inflator bracket configured to attach said inflator to said body structure of the vehicle other than said A-Pillar of the vehicle.

8. The inflatable safety restraint assembly for a vehicle of claim 1, further comprising a plenum connected to said inflator.

9. The inflatable safety restraint assembly for a vehicle of claim 8, further comprising a rigid fill tube connected to said plenum and said flexible tube.

10. The inflatable safety restraint assembly for a vehicle of claim 9, further comprising a second rigid fill tube connected to said plenum and a second flexible tube.

11. The inflatable safety restraint assembly for a vehicle of claim 9, further comprising an electronic control valve configured to alter flow within said rigid fill tube.

12. The inflatable safety restraint assembly for a vehicle of claim 9, further comprising a pyrotechnically activated control valve configured to alter flow within said rigid fill tube.

13. The inflatable safety restraint assembly for a vehicle of claim 9, further comprising a clamping device configured to attach said rigid fill tube and said flexible tube.

14. The inflatable safety restraint assembly for a vehicle of claim 9, further comprising a clamping device configured to attach a pliable fill tube sock and said rigid fill tube.

15. The inflatable safety restraint assembly for a vehicle of claim 9, further comprising a clamping device configured to attach a pliable fill tube sock, said flexible tube and said rigid fill rube.

16. The inflatable safety restraint assembly for a vehicle of claim 8, further comprising a second plenum connected to a second inflator.

17. The inflatable safety restraint assembly for a vehicle of claim 1, wherein said flexible tube is configured to withstand deployment loads generated during discharge of a gas by said inflator.

18. The inflatable safety restraint assembly for a vehicle of claim 1, wherein said flexible tube is a flexible metal hose.

19. The inflatable safety restraint assembly for a vehicle of claim 1, wherein said flexible tube is comprised of a plurality of rigid tubes connected with rotating joints.

20. The inflatable safety restraint assembly for a vehicle of claim 1, wherein a pliable fill tube sock of said cushion diffuser is attached to said first end of said flexible fill tube.

21. The inflatable safety restraint assembly for a vehicle of claim 20, wherein said pliable fill tube sock is attached to said outer cushion of said cushion pack.

22. The inflatable safety restraint assembly for a vehicle of claim 1, further comprising an A-Pillar assembly configured to attach said cushion pack to said A-Pillar of the vehicle.

23. The inflatable safely restraint assembly for a vehicle of claim 22, wherein said A-Pillar assembly is comprised of a carrier and a show surface trim piece that are configured to attach said cushion pack and at least a portion of the flexible tube to said A-Pillar of the vehicle.

24. The inflatable safety restraint assembly for a vehicle of claim 23, wherein said carrier and said show surface trim piece are attached with a plurality of hook attachments of said carrier that are configured to mate with a plurality of receptacles of said show surface trim piece.

25. A method of installing an inflatable safety restraint assembly into an automotive vehicle, comprising:

attaching a cushion pack to an A-Pillar of the vehicle;

connecting a first end of a flexible tube to said cushion pack;

adjusting said flexible tube such that said cushion pack is located on a cushion pack carrier;

adjusting said flexible tube so that a second end of said flexible tube is connected to an inflator that is configured for attachment to a body structure of the vehicle other than said A-Pillar of the vehicle, wherein said body structure of the vehicle other than said A-Pillar of the vehicle is a vehicle instrument panel;

positioning said cushion pack carrier on an outer surface cover; and installing said vehicle instrument panel into the body of the vehicle.

26. The method of claim 25, further comprising installing an outer surface cover on said vehicle instrument panel.

27. The method of claim 25, further comprising adjusting said flexible tube to accommodate a movement of said cushion pack from said cushion pack carrier on said outer surface cover to said A-Pillar.

28. The method of claim 25, further comprising installing a headliner substantially over said cushion pack attached to said A-Pillar of the vehicle.

29. The method of claim 25, wherein said cushion pack is attached to an airbag tether.

30. The method of claim 25, wherein a closeout panel is installed between said vehicle instrument panel and said cushion pack.

31. A method of installing an inflatable safety restraint assembly into an automotive vehicle, comprising:

attaching a cushion pack to an A-Pillar of the vehicle;

connecting a first end of a flexible tube to said cushion pack; and adjusting said flexible tube so that a second end of said flexible tube is connected to an inflator that is configured for attachment to a body structure of the vehicle other than said A-Pillar of the vehicle; wherein said body structure of the vehicle other than said A-Pillar of the vehicle is a vehicle instrument panel;

installing an outer surface cover on said vehicle instrument panel; and adjusting said flexible tube such that said cushion pack is located on a cushion pack carrier configured for placement on said outer surface cover.

32. The method of claim 31, further comprising:

installing said vehicle instrument panel into the body of the vehicle.

33. The method of claim 31, further comprising adjusting said flexible tube to accommodate a movement of said cushion pack from said cushion pack carrier on said outer surface cover to said A-Pillar.

34. The method of claim 31, further comprising installing a headliner substantially over said cushion pack attached to said A-Pillar of the vehicle.

35. The method of claim 31, wherein said cushion pack is attached to an airbag tether.

36. The method of claim 31, wherein a closeout panel is installed between said vehicle instrument panel and said cushion pack.

37. A method of installing an inflatable safety restraint assembly into an automotive vehicle, comprising:

attaching a cushion pack to an A-Pillar of the vehicle;

connecting a first end of a flexible tube to said cushion pack;

adjusting said flexible tube so that a second end of said flexible tube is connected to an inflator that is configured for attachment to a body structure of the vehicle other than said A-pillar of the vehicle; wherein said body structure of the vehicle other than said A-pillar of the vehicle is a vehicle instrument panel;

installing an outer surface cover on said vehicle instrument panel;

adjusting said flexible tube such that said cushion pack is located on a cushion pack carrier configured for placement on said outer surface cover; and adjusting said flexible tube to accommodate a movement of said cushion pack from said cushion pack carrier on said outer surface cover to said A-Pillar.

38. The method of claim 37, further comprising:

installing said vehicle instrument panel into the body of the vehicle.

39. The method of claim 37, further comprising installing a headliner substantially over said cushion park attached to said A-Pillar of the vehicle.

40. The method of claim 37, wherein said cushion pack is attached to an airbag tether.

41. The method of claim 37, wherein a closeout panel is installed between said vehicle instrument panel and said cushion pack.

\* \* \* \* \*